C. J. SMITH.
FLUID PRESSURE REGULATOR.
APPLICATION FILED SEPT. 4, 1914.
1,243,996.
Patented Oct. 23, 1917.
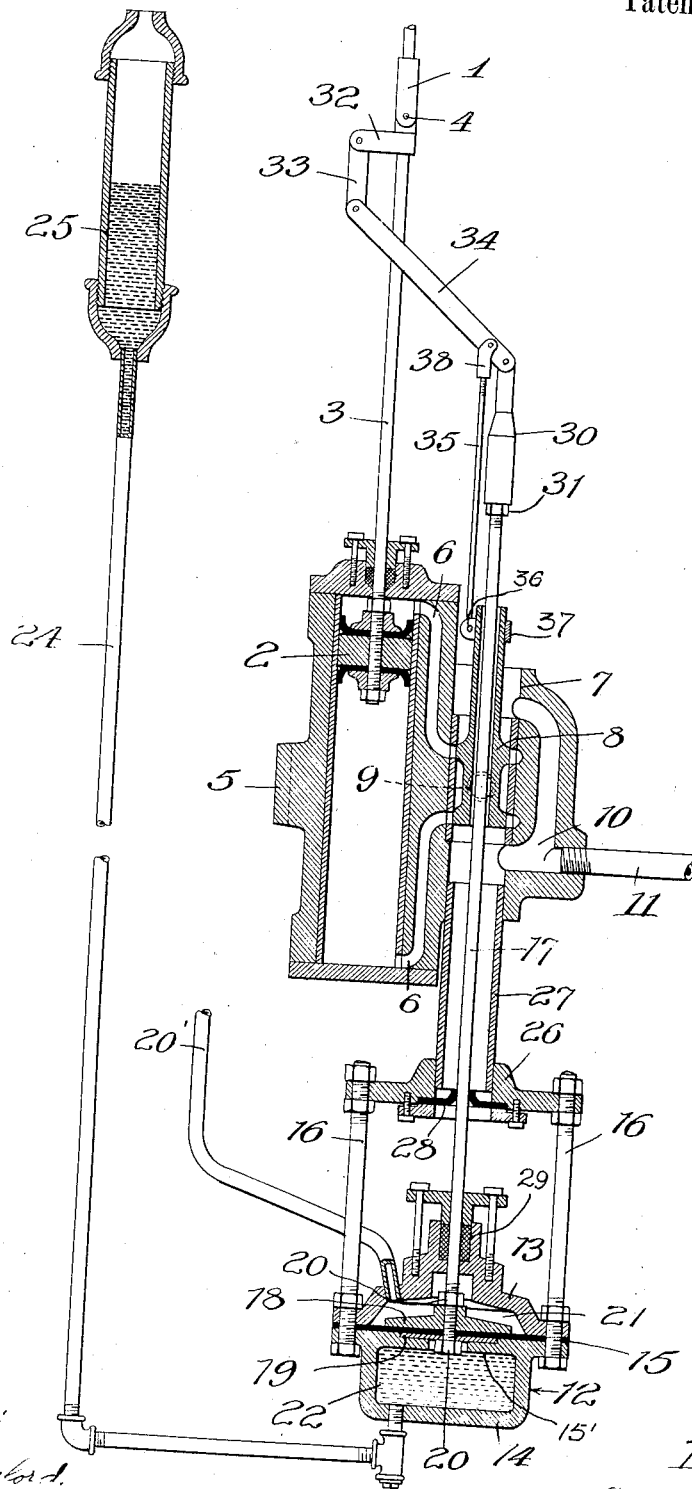
Witnesses:
Inventor:
Carl J. Smith,

UNITED STATES PATENT OFFICE.

CARL J. SMITH, OF INDIANA HARBOR, INDIANA.

FLUID-PRESSURE REGULATOR.

1,243,996.  Specification of Letters Patent.  Patented Oct. 23, 1917.

Application filed September 4, 1914. Serial No. 860,124.

*To all whom it may concern:*

Be it known that I, CARL J. SMITH, a citizen of the United States, residing at Indiana Harbor, in the county of Lake and State of Indiana, have invented a new and useful Improvement in Fluid-Pressure Regulators, of which the following is a specification.

My invention relates to improvements in regulating devices and more particularly to a form of regulator or governor in which the governing element consists of a diaphragm exposed on one side to the pressure of the fluid which is to be controlled and counterbalanced on its opposite side by the pressure of a regulating fluid.

The object of my invention is, in general, to provide a regulating mechanism of this type which will be strong and durable in construction and sensitive or delicate in operation.

Other objects and advantages of the invention will appear from the following detailed description of a form of apparatus embodying the same. For purposes of illustration I will show and describe my diaphragm regulator as applied to a steam-power plant for controlling the furnace dampers.

In the accompanying drawing, I have shown a diagrammatic view, partly in section and partly in elevation, of a diaphragm regulator adapted for such use.

In this drawing, the numeral 1 indicates a damper-controlling rod which may be connected, in a well understood manner, with the damper for the air-regulating means of a boiler furnace. For actuating the damper-control rod 1, I provide a piston 2, the piston rod 3 of which is linked to the damper-control rod, as by the pivoted connection 4. The piston moves within a cylinder 5 having cored fluid passages 6 leading to the valve-casing 7. The motive fluid, such as water under pressure, is admitted to the valve-casing through the port 9 and, for controlling the passage of the fluid to the cylinder, I provide the cylindrical slide-valve 8 which coöperates with the passages 6 in a well understood manner. The exhaust or exit passage in the valve-casing is through the cored opening 10 and the exhaust pipe 11.

It will readily be understood that as the slide-valve 8 moves upwardly from the position shown in the drawing, it will open communication between the inlet 9 and the upper end of the cylinder and between the exhaust or exit 10 and the lower end of the cylinder, and similarly, as the piston valve moves downwardly past the position shown in the drawing, communication will be opened between the inlet-port 9 and the lower end of the cylinder and between the exhaust 10 and the upper end of the cylinder.

For actuating the slide-valve 8 to control the movement of the piston 2 and through it the movement of the damper-rod 1, I provide the fluid-counterbalanced diaphragm-structure indicated, generally, by 12. This structure comprises a diaphragm casing formed of upper and lower sections 13 and 14, respectively, between the meeting faces of which is clamped the flexible diaphragm 15, the securing means consisting of stud-bolts 16 which are threaded through tapped openings in the flanges of the casing sections. The diaphragm stem 17 passes through a central aperture in the diaphragm and is secured by disks or heads 18 and 19 bearing, respectively, against the upper and lower faces of the diaphragm and clamped to form a fluid tight joint, as by the nuts 20. It will be noted that the lower casing section 15 is provided with an inwardly extending flange 15' which supports the lower face of the diaphragm and the lower head 19 thereof, and prevents undue distortion of the diaphragm downwardly. A pipe 20' communicating with the boiler or steam line of the power plant which is to be regulated, transmits the steam pressure to the upper diaphragm chamber 21. The counterbalancing pressure is furnished by a fluid body 22, maintained at the desired pressure by any suitable means such as a simple fluid column, as indicated at 24 in the drawing. When the latter expedient is adopted, I provide at the top of the fluid column an enlargement or well 25 which serves as a reservoir and as a means for determining the delicacy or range of action of the regulating mechanism, as will later appear.

It will be noted from the drawing that the lower casing section 14 is of considerable volume. This is an important feature of my invention, since the casing section may this be made to act as a safety-trap in case the diaphragm should be ruptured. Thus where mercury is used as the counterbalancing fluid, the cost of the quantity of fluid used is considerable and it becomes important to provide not only against leakage but against loss of the entire fluid body in the event of the diaphragm failing. Both of these ends are accomplished by the construction illustrated. The casing section 14 is completely sealed and therefore there is no possibility of leakage from the same, and by tapping the fluid column pipe 24 into the bottom of the casing section, the latter may be entirely filled with water, the mercury being contained only in the column proper. Not only is the quantity of mercury thus materially lessened, but in case the diaphragm should fail, or the diaphragm housing leak at the joint of the two sections, the mercury will merely displace the water within the closed lower casing section 14, and thus be effectually trapped and its loss prevented. It is essential to this result, however, that the casing section be of sufficient volume to contain the whole quantity of mercury within the column 24 and well 25. Obviously, such a result may only be had where an auxiliary fluid, the loss or escape of which is unimportant, is normally contained within the casing section, and the mercury is confined to the column proper.

A further advantage of this construction lies in the fact that the column and casing section 14 form the arms of a U-tube, and the casing section being filled with water, the effective length of this arm is far less, in fact about 90 per cent. less, than if the casing were filled with mercury. The necessary height of the fluid column 24 which forms the other leg of the U-tube is thus reduced, and this factor also acts to reduce the cost of the apparatus by reducing the quantity of mercury employed.

The upwardly extending ends of the stud-bolts 16 carry an enlarged head 26 which fits tightly over a tube or cylinder 27 forming a part of the exhaust chamber 10. The head 26 carries a gland 28 which prevents leakage of the exhausted fluid from the chamber 10 down the diaphragm stem. A second gland 29 carried by the casing section 13 prevents the escape of steam from the diaphragm chamber 21.

As will be noted from the drawings the slide-valve 8 is of tubular form, and through the bore thereof extends the diaphragm stem 17, the stem and the valve having a loose fit, as illustrated, to permit of their relative movement without friction. The upwardly extending end of the diaphragm stem 17 is threaded and on the threaded extremity is mounted an adjustable head 30 which may be secured in any desired position of adjustment as by a lock-nut 31. Adjacent its upper end the piston rod 3 carries an angular bracket 32 from which depends a pivoted link 33, and between the lower end of the latter and the head 31 is carried a floating lever 34 which forms the operating member for the slide-valve 8. Connection between the floating lever and the slide-valve is formed by a link 35, pivotally secured at its lower end to an ear 36 carried by a band 37 clamped around the slide valve, and a pivoted head 38 which is adjustably secured on the upper end of the link.

The operation of the regulator or governor described above is as follows:

It being assumed that it is desired to maintain the boiler pressure at some definite point, say 80 pounds, the fluid column 24 will be so adjusted as to produce this pressure within the lower diaphragm chamber 22. By the use of mercury or other fluid of high specific gravity, this result may be accomplished without resorting to a column of impracticable height. Assuming that the damper-rod is in the position shown in the drawing, acting to maintain the dampers in the closed position, then, if the boiler pressure should fall below 80 pounds, the diaphragm will be immediately unbalanced and will be distorted upwardly to such a distance that it again becomes balanced. Assuming that the resistance of the diaphragm itself to such distortion is negligible, the required movement will be determined by the relative cross-section of the fluid chamber 22 and the reservoir 25. It will be seen that as the diaphragm is lifted the volume of the chamber 22 will increase and the level of mercury within the well 25 will fall. This action will continue until the height of the fluid column is such as to just balance the pressure of the fluid within the chamber 21, which point will be determined by the cross-section of the well, it being clear that if the well were very small in diameter a relatively small increase in volume in the chamber 22 would cause a large change in the level of the liquid within the well.

In the upward movement of the diaphragm the floating lever 34 will have been rocked about its pivot on the link 33, thus raising the link 35 and connected slide-valve 8 to admit the motive fluid from the inlet 9 to the upper end of the cylinder and to connect the lower end of the cylinder with the exhaust passage. The pressure of the motive fluid will therefore operate to force down the piston and by means of the rod 1, the dampers will be opened to provide the increased draft necessary to raise the steam pressure. In the downward movement of the piston 2, the link 34 will be rocked in an anti-clockwise direction about its pivot on the head 30 and in this movement the slide-valve 8 will be carried downwardly, and, accordingly, as the diaphragm has moved upwardly to the full limit of its distortion or to some fraction thereof, the slide-valve 8 will close the admission and exhaust passages when the piston has moved downwardly a proportional amount. The parts are so constructed and adjusted that when the diaphragm is moved to the full limit of its distortion, it will require a full downward stroke of the piston to close the cylinder ports. As the steam pressure rises the diaphragm will be forced downwardly and in this movement the floating lever 34 will rock about the link 33 to move the slide-valve 8 downwardly and to open communication between the motive fluid inlet 9 and the lower end of the piston and between the exhaust passage 10 and the upper end of the piston and, accordingly, the piston will be caused to rise to close the dampers.

From the above description it will be apparent that I have provided a form of diaphragm regulator in which the diaphragm is actuated in both directions by the pressure of a fluid, operative over its whole face, and without the use of springs or weights, the stresses imposed by which are difficult of distribution and are almost certain to cause friction, sluggishness, or failure of delicate regulation, and undue wear.

It will further be seen that the delicacy or range of the governor mechanism may be varied to any reasonable extent by varying the size of the liquid well 25.

It will further be seen that I have provided in combination with the fluid-counterbalanced diaphragm a simple and efficient motor for operating the regulating mechanism proper.

While I have shown and described in considerable detail a specific embodiment of the invention, it is to be understood that such showing and description is illustrative only and my invention is not to be regarded as limited thereby, except as such limitations are included within the terms of the following claims in which it is my intention to cover all novelty inherent in the invention in view of the prior art.

What I claim as new and desire to secure by Letters Patent is:—

1. In a fluid-pressure regulating device a diaphragm casing, a flexible diaphragm mounted therein and forming a horizontal partition in said casing intermediate its length, means for exerting the pressure of a fluid to be regulated on the upper face of said diaphragm, an auxiliary fluid of relatively low specific gravity in the lower end of said casing, and a counterbalancing fluid column of relatively high specific gravity communicating with the lower end of said casing to communicate its pressure to the lower face of said diaphragm through the auxiliary fluid, the volume of said counterbalancing fluid column being less than the volume of said auxiliary fluid, substantially as and for the purpose described.

2. In a fluid-pressure regulating device, a diaphragm casing, a flexible diaphragm mounted therein, a partition in said casing intermediate its length, means for exerting pressure of fluid to be regulated on the upper face of said diaphragm, an auxiliary fluid of low specific gravity in the lower end of said casing, a counterbalancing fluid column of relatively high specific gravity communicating with the lower end of said casing to communicate its pressure to the lower face of said diaphragm through the auxiliary fluid, and a reservoir at the upper end of said counterbalancing fluid column, the volume of said counterbalancing fluid column and reservoir being less than the volume of said auxiliary fluid, substantially as and for the purpose described.

CARL J. SMITH.

In presence of:
L. HEISLAR,
N. B. DEARBORN.